United States Patent [19]

Yeh

[11] 4,406,629
[45] Sep. 27, 1983

[54] CARDS FOR SPELLING READOUT

[75] Inventor: Richard S. Yeh, South Pasadena, Calif.

[73] Assignee: JRT Associates, South Pasadena, Calif.

[21] Appl. No.: 365,235

[22] Filed: Apr. 5, 1982

[51] Int. Cl.³ .......................... G09B 5/04; G11B 25/04
[52] U.S. Cl. .......................................... 434/311; 360/2
[58] Field of Search .............. 434/157, 169, 311, 312, 434/319; 360/2

[56] References Cited

U.S. PATENT DOCUMENTS

| 3,348,320 | 10/1967 | Brokaw | 434/312 |
| 3,737,884 | 6/1973 | Wallace | 360/2 |
| 3,760,164 | 9/1973 | Kral | 434/311 X |
| 3,784,763 | 1/1974 | Budrose | 434/312 X |
| 3,801,804 | 4/1974 | Von Glahn et al. | 360/2 X |
| 3,803,350 | 4/1974 | Lemelson | 360/2 X |
| 3,943,563 | 3/1976 | Lemelson | 360/2 X |
| 3,997,917 | 12/1976 | Kihara | 360/2 X |
| 4,158,264 | 6/1979 | Orth | 434/311 |
| 4,237,624 | 12/1980 | Yeh | 434/311 X |

Primary Examiner—William H. Grieb

[57] ABSTRACT

An analogue serial input/output device with two electromagnetic transducer heads is provided to have spellings displayed on an electronic readout and to reproduce pronunciations simultaneously from a flexible card which is mounted with a wide magnetic tape recorded with said both. The device system is capable of translating verbally and by spellings reciprocally among words of several languages.

2 Claims, 3 Drawing Figures

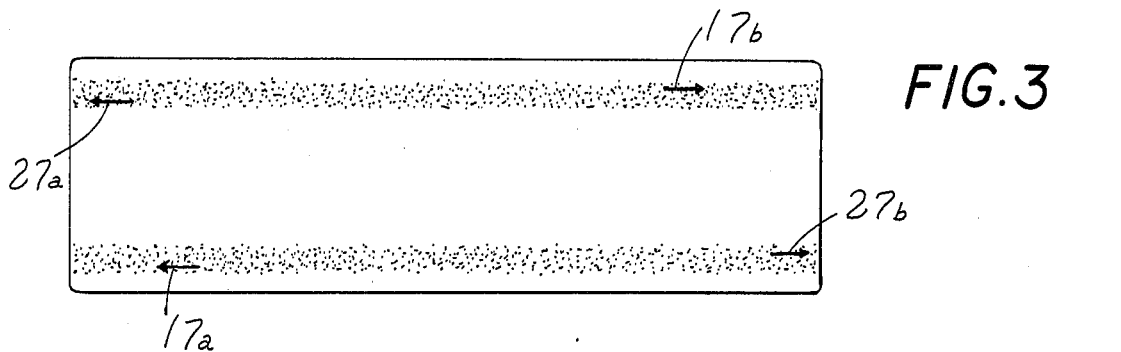
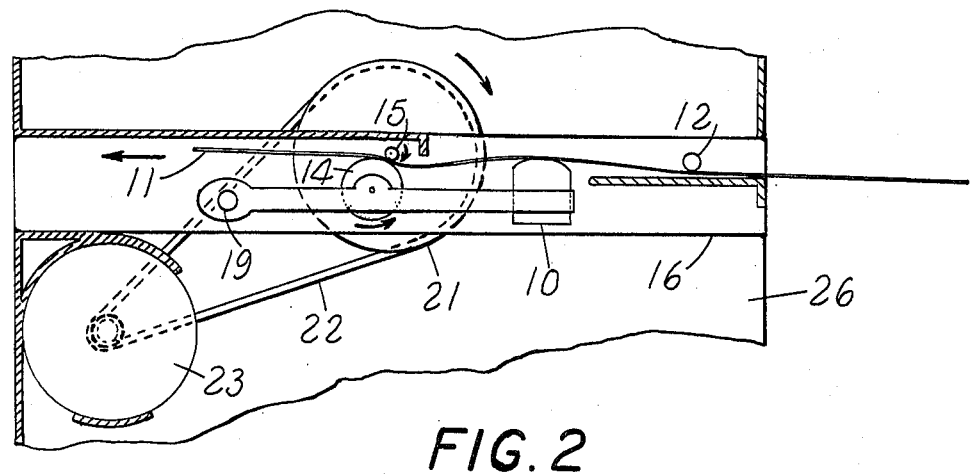
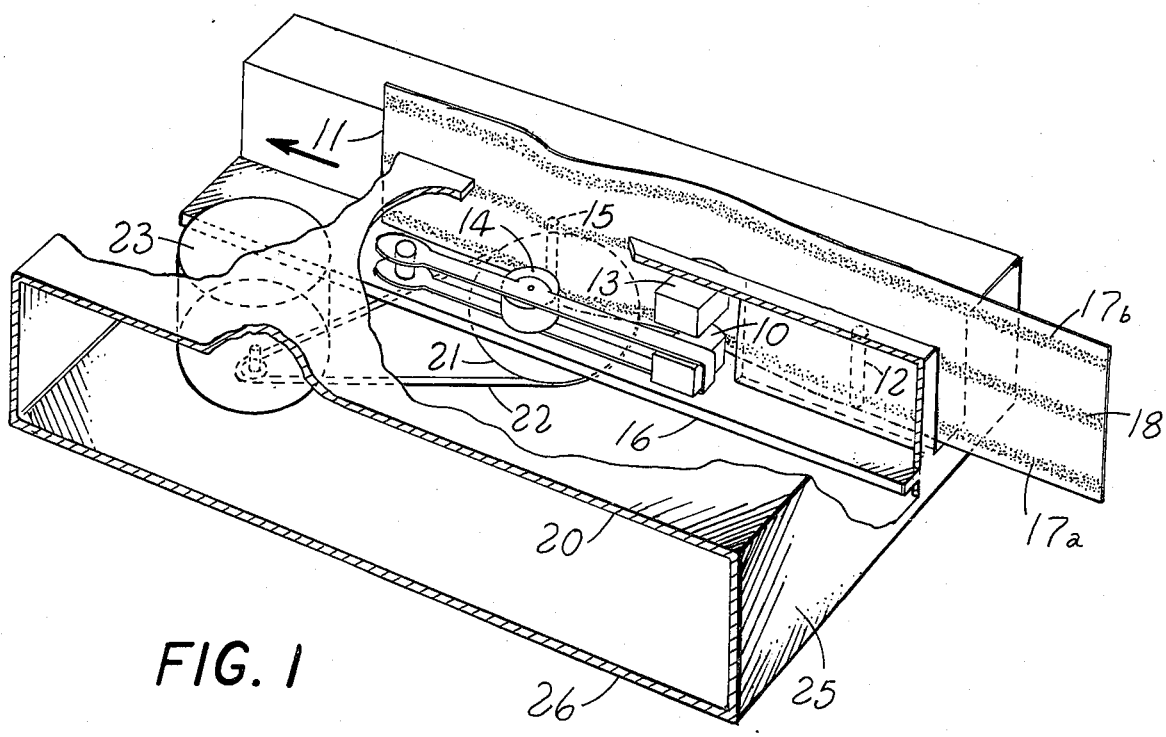

CARDS FOR SPELLING READOUT

This invention relates in general to an analogue (memory) serial input/output device operable with a special kind of cards that is disclosed in U.S. Pat. No. 4,237,624, and especially useful in learning spellings as well as pronunciations. The device is interfaced with a microprocessor for displaying spellings. By serial storage of magnetic memory, it is referred to computer codes recorded on audio magnetic tape-sheet; an analogue to digital converter interface circuitory (D/A converter for recording) is connected in order to have analogue recordings that represent display codes assembled into a form of parallel bits before going into a microprocessor. Usual digital computer tapes are recorded with several digital bits in parallel across the width of the tape, and magnetically susceptible powder on the tape is saturated when bits are in.

In accordance with the present invention, there is described an analogue serial input/output device with two electromagnetic transducer heads for displaying spellings on an electronic readout and reproducing pronunciations of words simultaneously from a flexible card recorded with said both; a flexible card is locally bent over the surface of a drive roller and then oppositely bent over the transducer heads during said two kinds of simultaneous processes as the cards are inserted one at a time into the device and transported.

Although readout display for alphabetical words are conveniently demonstrated by using a readily available computer terminal with a screen, it is not the prime purpose to computerize every said processes. Nevertheless, since microprocessors (computer) are available by now as a consumer product, input typing through computer keyboard and subsequent readout display or output became common practices just like typing any manuscript instead of writing.

Texas Instruments has language learning machines, but the drawbacks at this moment are due to twofold: (A) The quality of reproduced speech sound is inferior comparing with that of conventional tape recorder devices. (B) The keyboard and character generator are so far limited to alphanumeric characters.

Craig Corporation has introduced an electronic language translator (M100) which functions among alphabetic spellings of several different languages, but without pronunciations. The apparatus of U.S. Pat. No. 3,997,917 for reproducing pronunciations includes a solid card which is twice longer than said flexible card of U.S. Pat. No. 4,237,624 the card used only for pronunciations by (Sony Corporation; (cp1100, card length: 18,7 cm) can not be considered as weightless, requiring at least some period of initial speed adjustment and making the card length even longer.

Accordingly it is an objective of the present invention to provide a simple and compact device system for generating pronunciations and concurrently displaying the spelling of each word or a short sentence from flexible cards. Another objective of the invention is to provide a method of identifying the portion of recorded tape sheet to be mounted onto the card in a manufacturing process of said flexible cards.

Through the device is interfaced especially with the character generator portion of Radio Shack TRS-80 Color computer and connected to a television for electronic display of spellings, pronunciations and spelling readout codes are stored in linear tracks on flexible cards for said objectives, whereas in many of word processing machines circular tracks on disc for digital recording are used for computer maneuverability. Still more of dimensional accuracies are required for the device construction when the device is used for spelling display via computer means, comparing with devices primarily for speech sound.

When the drive roller of the device is mounted on a planar (floor) board but not mounted at all at the other end of the drive shaft, a flexible card is inserted so as to have the tracks near the planar board recorded the display codes. Pronunciations are easily reproduced on any longitudinal tracks of the flexible cards; the linear portion of tape-sheet that stores the codes for displaying spellings or characters is called spelling track; the linear portions that store pronunciations are called pronunciation tracks; each of the tracks are either separated and secured together with the flexible card or specially allocated linear portions of a tape sheet.

Radio Shack Pocket Computer includes a 24 digit dot matrix liquid crystal display; using the Pocket Computer which has a slower baud rate, the length of the flexible card is chosen to be 6.75 inch when said device is operated viva the cassette interface, Cat. No. 26-3503; the 6 and ¾ inch flexible card can accommodate 20 alphanumerical letters using spelling display codes. With faster microcomputers of the corresponding length of the flexible card is shorter. Twenty digits for alphaneumerical letters can accommodate about 3 or 4 words, each consisting of one or two syllables; even one word consisting of ten letters requires said recording length and the remaining 9 or 10 positions are reserved but unused when the device system is connected with the Pocket Computer and the interface; the size of the buffer is eighty letters.

Making such a device with multiple transducer heads for multiple track recording is regarded as having no commercial merit as it becomes an expensive unit for home use and for learning languages. The sound reproducing device operable with a flexible card as disclosed in U.S. Pat. No. 4,237,624 has an electromagnetic transducer head which is laterally shiftable across the card so that any track can be accessed for recording pronunciations. A planar board may be inclined plane as long as one of the longitudinal boundaries of a flexible card slides along the board. The substrate of the disc used for digital information storages and retrieval is often a sheet of a floppy material; such a disc can be one of the examples of tape sheet if analogue signals can be recorded without distortions.

FIG. 1 is a perspective of an arrangement for the analogue serial input/output device with two transducer heads, showing a flexible card being transported.

FIG. 2 is a top view of the same arrangement for said device as that of FIG. 1 without the cover of housing.

FIG. 3 shows a flexible card as a flat and rectangular object with both pronunciations and spelling readout codes recorded on each track for a reciprocal translation of words.

As shown in FIG. 1, an edge of the flexible card 11 slides on the board 16. The pair of roller 14 and 15 are used for flexible cards to be transported according to the disclosure in U.S. Pat. No. 4,237,624. The drive shaft or roller 15 mounted rotatably and perpendicularly on the board 16 does not have to be extended across the flexible card as the card is practically weightless and the torque for causing lateral movement or tilting is counter-balanced by the reactional torque from the board 16 and from the hook on the pole 12. One half of the card width for the length of the drive roller 15 measured from the surface of the board 16 is considered to be sufficient. The roller mounted rotatably on the lever 24 is wrapped all around by a smooth rubber material and called the rubber roller 14.

The transducer head 13 used for pronunciations is fixed with respect to the board 16 and located above the other head 10, which is primarily for spelling readout; both tangential planes imagined at the centers of the curved front surfaces of the heads coincide and remain perpendicular with respect to the board when the I/O device is operative. Referring to FIG. 1, the head 13 is conveniently fixed to the cover surface 20 of the housing; the sole surface 26 of the housing 25 is situated below the board 16. The head 10 used for readout and the rubber roller 14 are mounted on the lever 24 shiftable in an imaginary plane parallel to the board 16. The spelltracks 17a and 17b, and the pronunciation track 18 on the flexible card 11 are marked in FIG. 1.

The metal shaft of a flywheel itself is utilized as the drive roller 15; a pulley of a certain diameter is fixed concentrically on the shaft of a motor 23 and coupled by a rubber belt 22 with the engraved rim of the flywheel 21; the lever 24 turns about a fulcrum 19. While said flexible card is transported by the card feeder, which comprises a pair of drive rollers, power transmitting means and guide means, the flexible card is slightly but sufficiently bent over the surfaces of the heads 10 and 13 so that the recording portions are in proper contact with the heads; guide means comprising the board 16 and a pole 12 are shown in FIGS. 1 and 2. A hook of an upside-down L figure, located on the pole 12 at a distance from the board 16 equal to or slightly larger than width of a flexible card, is used when the length of the floor is shorter comparing with the length of the card for preventing the card from a side motion. An optimum position for the pole 12 is located at a symmetrically opposite position from that of the drive roller 15 with respect to the body of the head(s); the diameter of the pole 12 about the same as that of the drive roller is used as an example. The pole has to be mounted rotatably only when it is used as a part of another pair of drive rollers for a card to be transported either direction.

The location of the direct current motor can be in any quadrant with respect to the drive roller 15 and the curved natural path of the card. Partitions and side walls are a part of housing conveniently made into any form as long as a flexible card is transported through according to the guide means.

FIG. 1 also illustrates a flexible card utilized for reciprocal translations; when English spelling is to be translated into French spellings, for instance, the display codes for "HELLO BONJOUR" is recorded with English heading, i.e. "hello", on one of the longitudinal track 17a located near an edge. The identical codes for "HELLO BONJOUR" or the codes for "BONJOUR HELLO" are recorded with French heading, i.e. "bonjour", on the same face but on the other edge track 17b of the flexible card; when French is to be translated into English, the flexible card 11 is turned around in such a way that 17a and 17b are interchanged keeping the magnetically susceptible side of the card 11 facing the heads 10 and 13. The pronunciation track 18 is located between them.

The recording directions for the longitudinal spelling tracks 17a and 17b are opposite to each other with respect to the body of the flexible card. Pronunciation tracks located between the spelling readout tracks can be grouped into those of oppositely recording directions by the longitudinal center line of the flexible card; the height of the upper transducer head measured from the board 16 is allowed to vary from a minimum to the half of the card width depending on the position of pronunciation track. Referring to FIG. 1, in which the width of the flexible card 11 is twice of the distance between the two heads 10 and 13, the middle pronunciation track 18 is recorded with pronunciations in English and French. Both are recorded in one direction successively and also in the other direction; the width of the track is chosen to be comparable to that of usual cassette tapes.

Pronunciations and readout codes for spellings can be recorded on each half of a track; the recording directions with respect to the flexible card are opposite to each other but both recordings run in the same directions in reference to the heads, once using the transducer for spelling readout, and once for pronunciations using the other transducer by having the flexible card turned around; the width of the card has to match the distance between two transducer heads. With one transducer, only one of the edge tracks is used for both kinds of recordings whereby the card is transported in a direction for reproducing pronunciations then in the other direction for displaying spellings or vice versa without turning around the card.

With the two tracks on the flexible card as shown in FIG. 3, another example of a flexible card for reciprocal translation of words using two transducer head is given. Since one of the transducers is used for sound reproduction and the other for spelling display, one of the longitudinal edge tracks is recorded, for instance, with English pronunciation in the direction 27a and with French spelling in the opposite direction 17b from that of English pronunciation; the other edge track is recorded with English spelling in the direction 17a which is the same as English pronunciation and French pronunciation in the other direction 27b, which is the same direction 17b as French spelling in the former edge track.

Though FIG. 3 shows a flexible card as a flat and rectangular object, it becomes locally curved like the flexible card 11 shown in FIG. 1 while the card is transported. For a flexible card pictured in FIG. 3 to be operable with the arrangement for said analogue serial I/O device of FIG. 1, the width of the flexible card is made into one half of the flexible card 11 of FIG. 1, i.e. 17b of FIG. 3 should occupy the position of track 18 so as to match lateral positions of the edge tracks with that of the heads 10 and 13. Some details of construction and dimensions are rather not to be considered as limitations upon the invention or upon the claims as long as a flexible card is used with the analogue serial input/output device.

When the spelling display codes for "HELLO BONJOUR" under the file name of "HELLO", for example, is transferred from the Pocket Computer to an audio tape by CSAVE "HELLO" instruction, the first several inches are blank and the spelling display codes start after that. In order to locate the actual starting position on so recorded tape, which is superimposed but not yet secured on a material of flexible cards, the portion of the tape sheet along a neighboring track corresponding to said blank period can be recorded with an audio frequency; in production the process can be repeated till the optimum start and stop positions are located before being laminated as flexible cards.

Since the flexible card is practically weightless, the blank space corresponding to the period of initial speed adjustment is eliminated making the flexible card considerably shorter. If a word is made of more than seven letters, the excess is ignored from the heading but the entire word remains as the spelling display codes.

The following example shows the steps for operating said serial I/O device system with a flexible card, on which (1) English spell for instance APPLE is printed together with anything else to explain the word, and (2) the codes (codes) for displaying the spelling APPLE through the LCD screen of Radio Shack Pocket Computer, is recorded under the heading APPLE on the spelling track and its pronunciation on the center track:

(A) connect said device to Radio Shack TRS-80 Pocket Computer (Cat. No. 26-3501) with the cassette interface (Cat. No. 26-3503)

(B) insert the flexible card into the device and press PLAY button for shifting the lever so as to clamp the card by the drive roller at the leading edge but having "pause motor" button pushed in;

(C) type in CLOAD "APPLE" through the key board;

(D) release "pause" button and press ENTER key of the computer simultaneously;

(E) the pronunciation is reproduced and the spelling APPLE is displayed on the screen of the computer upon giving list command and pressing ENTER key.

An alternative example to the operating steps (B) and (D) is: leave PLAY button pushed in to clamp the card mechanically without having the motor in motion by separating the direct current voltage source for the motor from the rest of the circuit; (for the step (D)) press ENTER key of the computer and "motor on" switch by a separate voltage source at the same time. Still another alternative example demonstrates a combination steps of (B) and (D), which is to be carried out after step (C), is: insert the flexible card into the device and turn on the motor together with the flywheel in advance by said separate voltage source, then press ENTER key of the computer and, at the same time, shift the lever so as to have the card transported by the drive rollers. The third example is mechanically distinct from the first two examples, but both means are found to operate satisfactorily.

There is a system of writing using characters originated in conventional pictures but attached by a verbal phase forming another character. Two of said characters (khanji) often corresponds to an English word, but usage varies through phoneme among those people using the characters, such as that of Japanese language, though the writing system is originated in ancient China. There is a pocket-size said character words generator manufactured by Canon Corporation; it functions through keying corresponding Japanese phonetic alphabet called Hiragana. A correct set of Hiragana keys have to be pressed in a correct sequence just like spelling English words. In Canon Electronic Kanji File, CA-1000, said usage limitation is built-in according to Japanese language.

When an electronic character generator for said characters is not available, there are sound reproduction devices for audio visual learning of the character words by reading the printed characters on flexible cards. Furthermore, a device system for both pronunciations and simultaneous electronic readout of spellings is not regarded satisfactory at least within the present-day category of consumer electronics, especially in view of quality of speech sound reproduced and compactness of the device system, even though character generators are available. The present invention can fill the needs.

What is claimed is:

1. An analogue serial input/output device for use in combination with a flexible card comprising a wide magnetic tape of card size and a flexible sheet of card materials, having laminated over the back surface of said wide magnetic tape not coated with magnetically susceptible materials, thereby secured together at least at the edges of said card by means of adhesive tapes, the flexible card being locally bent during the processes of pronunciation reproduction and spelling readout through an electronic display system, said device comprising:

a. a planar board for one of the longitudinal boundaries of said card to slide along while said flexible card is perpendicularly situated with respect to said board and transported;

b. a lever movable in an imaginary plane parallel to said board, so as to clamp or release said card in order to place said lever on the portions recorded with the spelling display codes or pronunciations, and located on one, or both, of the longitudinal edge(s) of said flexible card;

c. an electromagnetic transducer head primarily used for readout display and mounted on said lever such that the tangential plane imagined at the center of the curved front surface of said head is perpendicular to said board;

d. another electromagnetic transducer head used for pronunciation reproduction mounted above said board of said device at a distance equal to the lateral distance between said two kinds of recording portions on said flexible card in such a manner that both tangential planes imagined at the centers of the curved front surfaces of said heads coincide and remain perpendicular to said board when said device is operative;

e. a rubber roller rotatably mounted on said lever in the direction perpendicular to said board and disposed on the outgoing side for a card in relation to said head;

f. a drive roller rotatably mounted on said board perpendicularly and disposed in such a manner that said flexible card is locally bent over the surface of said drive roller to increase an arc of frictional engagement and to propel said flexible card when said drive roller is connected to a power transmitting means, and said flexible card is clamped instantaneously between said drive roller and said rubber roller, comprising the pair of drive roller located at outgoing side for a card;

g. guide means for said device comprising said planar board, a pole mounted perpendicularly on said board and a hook located on said pole at a distance from said board equal to or slightly larger than the width of said flexible card, said pole located preferably at a symmetrically opposite position from that of the drive roller with respect to the body of said heads in order to have said flexible card put at proper place and locally bent over the curved front surface of said heads which are disposed slightly crossing the imaginary plane drawn asymptotically from the incoming side for a card in such a manner to include the contact line of said pair of drive rollers, when said lever is in clamping position and said card is transported;

h. a card feeder comprising said pair of drive rollers, said power transmitting means and said guide means, said card feeder operative to have the central areas of said heads make a sliding contact with the card portions allocated for recording spelling display codes and pronunciations; said power transmitting means comprising a direct current motor, a pulley fixed coaxially on the shaft of said motor, a flywheel, a rubber belt, and a metal shaft fixed at one end to the center of said flywheel and utilized as the body of said drive roller, said flywheel being engraved on the rim whereby coupled with said pulley by said rubber belt to transmit rotational motion to said drive roller;

i. a power supply, a speaker, a microphone, ear-phone and electronic circuitories necessary in position and connected to said transducer heads in order to have analogue spelling display codes serially recorded on and to regenerated the and spellings or characters from said flexible cards by means of interfacing said device with a character generator besides having pronunciations recorded on and reproducing from the sound track of said flexible cards.

2. An analogue serial input/output device for use in combination with a flexible card comprising a wide magnetic sheet of card size and a flexible sheet of card materials, having superimposed partially over a portion of the surface coated with magnetically susceptible materials but excluding the area of longitudinal tracks reserved for recording analogue spelling display codes and the area of the tracks recorded with pronunciations, thereby secured together at least along lateral edges of said card by adhesives, the flexible card being locally bent during the process of sound reproduction and spelling readout through an electronic display system, said device comprising:

a. a planar board for one of the longitudinal boundaries of said card to slide along while said flexible card is perpendicularly situated with respect to said board and transported;

b. a lever movable in an imaginary plane parallel to said board, so as to clamp or release said card in order to place said lever on the portions recorded with the spelling display codes and pronunciations, and located on one, or both, of the longitudinal edge(s) of said flexible card;

c. an electromagnetic transducer head primarily used for readout display and mounted on said lever such that the tangential plane imagined at the center of the curved front surface of said head is perpendicular to said board;

d. another electromagnetic transducer head used for pronunciation reproduction, located above of said electromagnetic transducer head which is primarily used for readout display, and mounted on said board of said device unit at a distance equal to the lateral distance between said two kinds of recording portions of said flexible card in such a manner that both tangential planes imagined at the centers of the curved front surfaces of said both heads coincide and remain perpendicular with respect to said board when said device is operative;

e. a rubber roller rotatably mounted on said lever in the direction perpendicular to said board and disposed on the outgoing side for a card in relation to said head;

f. a drive roller rotatably mounted on said board perpendicularly and disposed in such a manner that said flexible card is locally bent over the surface of said drive roller to increase an arc of frictional engagement and to propel said flexible card when said drive roller is connected to a power transmitting means, and said flexible card is clamped instantaneously between said drive roller and said rubber roller, comprising the pair of drive roller located at outgoing side for a card;

g. guide means for said device comprising said planar board, a pole and a hook located on said pole at a distance from said board equal to or slightly larger than the width of said flexible card, said pole located preferably at a symmetrically opposite position from that of the drive roller with respect to the body of said heads in order to have said flexible card put at proper place and locally bent over the curved front surface of said heads which are situated slightly across the imaginary plane drawn asymptotically from the incoming side for a card in such a manner to include the contact line of said pair of drive rollers, when said lever is in clamping position and said card is transported;

h. a card feeder comprising said pair of drive rollers, said power transmitting means and said guide means, said card feeder operative to have the portions allocated for recording spelling display codes and pronunciations make a sliding contact with the central areas of said heads, said power transmitting means comprising a direct current motor, a pulley fixed coaxially on the shaft of said motor, a flywheel, a rubber belt, and a metal shaft fixed at one end to the center of said flywheel and utilized as the body of said drive roller, said flywheel being engraved on the rim whereby coupled with said pulley by said rubber belt to transmit rotational motion to said drive roller;

i. a power supply, a speaker, a microphone, ear-phone and electronic circuitories necessary in position and connected to said transducer heads in order to have analogue spelling display codes and serially recorded on and to reproduce pronunciations and spellings or character from said flexible cards by means of interfacing said device with a character generator besides having pronunciations recorded on and reproducing from the sound track of said flexible cards.

* * * * *